United States Patent [19]

Huebner

[11] Patent Number: 4,735,261
[45] Date of Patent: Apr. 5, 1988

[54] PLASTIC HEAT EXCHANGER

[75] Inventor: Fritz Huebner, Zeeland, Mich.

[73] Assignee: Plascore, Inc., Zeeland, Mich.

[21] Appl. No.: 800,662

[22] Filed: Nov. 22, 1985

Related U.S. Application Data

[62] Division of Ser. No. 417,639, Sep. 13, 1982, Pat. No. 4,588,543.

[51] Int. Cl.⁴ .................. F28F 21/06; F28F 9/18; F24H 3/02
[52] U.S. Cl. ....................... 165/76; 165/54; 165/173; 165/178; 165/905; 264/248
[58] Field of Search ............... 165/172, 173, 905, 76, 165/79, 148, 149, 150, 151, 152, 153, 83, 178, 54; 264/248

[56] References Cited

U.S. PATENT DOCUMENTS

| | | | |
|---|---|---|---|
| 2,065,515 | 12/1936 | Cornell, Jr. | 165/151 |
| 2,164,628 | 7/1939 | Sibley | 165/173 |
| 2,164,629 | 7/1939 | Sibley | 165/178 |
| 2,343,542 | 3/1944 | Faunce | 257/165 |
| 2,433,546 | 12/1947 | Cornelius | 18/59 |
| 2,882,023 | 4/1959 | Rizzo | 257/2 |
| 3,240,851 | 3/1966 | Scalora | 264/163 |
| 3,302,705 | 2/1967 | Witten, Jr. | 165/176 |
| 3,435,893 | 4/1969 | Withers | 264/249 |
| 3,442,002 | 5/1969 | Geary, Jr. et al. | 264/139 |
| 3,489,209 | 1/1970 | Johnson | 165/172 |
| 3,537,935 | 11/1970 | Withers | 156/382 |
| 3,616,022 | 10/1971 | Withers | 156/250 |
| 3,782,450 | 1/1974 | Swozil | 165/173 |
| 3,841,938 | 10/1974 | Grosse-Holling et al. | 156/296 |
| 3,934,323 | 1/1976 | Ford et al. | 156/251 |
| 3,993,126 | 11/1976 | Taylor | 156/296 |
| 4,028,817 | 6/1977 | Winstel | 34/86 |
| 4,066,122 | 1/1978 | Gross et al. | 165/175 |
| 4,078,602 | 3/1978 | Richer | 165/32 |
| 4,103,735 | 8/1978 | Warner | 165/39 |
| 4,114,683 | 9/1978 | Verlinden | 165/78 |
| 4,125,153 | 11/1978 | Stoneberg | 165/166 |
| 4,138,969 | 2/1979 | Thompson et al. | 122/421 |
| 4,164,255 | 8/1979 | Binet et al. | 165/173 |
| 4,171,089 | 10/1979 | Schossow | 237/55 |
| 4,219,073 | 8/1980 | Talmadge et al. | 165/39 |
| 4,235,281 | 11/1980 | Fitch et al. | 165/1 |
| 4,244,194 | 1/1981 | Haesters et al. | 165/173 |
| 4,246,958 | 1/1981 | Sagan et al. | 165/173 |
| 4,256,178 | 3/1981 | Fauvel | 264/248 |
| 4,303,122 | 12/1981 | Powell | 165/39 |
| 4,586,566 | 5/1986 | Kern et al. | 165/905 |

FOREIGN PATENT DOCUMENTS

| | | | |
|---|---|---|---|
| 540404 | 5/1957 | Canada | 165/173 |
| 0000189 | 1/1979 | European Pat. Off. | 165/79 |
| 2161279 | 4/1973 | Fed. Rep. of Germany | 165/175 |
| 1201614 | 1/1960 | France | 165/173 |
| 2302186 | 9/1976 | France | 29/157.4 |

Primary Examiner—Albert W. Davis, Jr.
Assistant Examiner—John K. Ford
Attorney, Agent, or Firm—Price, Heneveld, Cooper, DeWitt & Litton

[57] ABSTRACT

The specification discloses an air-to-air, polymeric heat exchanger having a housing and a core removably mounted within the housing. The housing includes four generally identical duct units, which are secured to one another, and a top and a bottom, which are secured to the duct units. The core includes a pair of end walls and a plurality of tubes extending between, and opening through, the end walls. Each end wall includes a plurality of tubular projections or pockets extending from the end wall in a common direction. Opposite ends of the tubes are secured within the tubular pockets in the opposite end walls. A method of constructing the core includes the step of severing the tubular projections after the tubes are positioned therein to expose the tube interiors through the end walls. Preferably, the tubular projections are severed using a hot wire to also fuse the tubes within the end walls.

2 Claims, 3 Drawing Sheets

PLASTIC HEAT EXCHANGER

This is a division of application Ser. No. 417,639, filed Sept. 13, 1982 now U.S. Pat. No. 4,588,543.

BACKGROUND OF THE INVENTION

The present invention relates to heat exchangers, and more particularly air-to-air heat exchangers.

It is often desirable to transfer the heat from a relatively warm air mass to a relatively cool air mass. It is also often desirable to prevent the two masses of air from intermixing during such transfer, such as where one of the masses is relatively dirty or contaminated. A variety of air-to-air heat exchangers has been developed for conveying two air masses past one another to effect the heat transfer. Often the heat exchangers include a housing and a core unit removably mounted within the housing. The core may be periodically removed from the housing and cleaned as necessary to keep the heat transferring surfaces clean. Preferably, both the housing and the removable core are fabricated of plastic or polymeric materials to reduce corrosion problems associated with contaminated air masses flowing through the exchanger.

However, known heat exchangers are not without their drawbacks. Firstly, the housings are typically specialized constructions requiring a relatively large number of parts. Accordingly, assembly costs are high because the manufacturer must make and inventory all of these parts for assembly of the units. Additionally, a large stock of replacement parts must be maintained for subsequent servicing of the units.

Secondly, the core units of the heat exchangers are also difficult and expensive to manufacture. Although heat exchanger cores have been made of plastic, known methods of assembling these cores are time-consuming and expensive. In one construction, the adjacent tubes within the core unit are fused together under heat and pressure. An example of this method of construction may be seen in U.S. Pat. No. 3,616,022, entitled METHOD OF MAKING HEAT EXCHANGE COMPONENTS and issued Oct. 26, 1971, to Withers; and U.S. Pat. No. 3,537,935, entitled APPARATUS FOR MANUFACTURING A HEAT EXCHANGER COMPONENT FORMED WITH FLEXIBLE PLASTIC TUBES and issued Nov. 3, 1970, to Withers. This method of assembly must be carefully controlled at the proper temperature and pressure to prevent spoiling the core unit during manufacture. Additionally, the method restricts air flow between and around the heat transfer tubes. In another construction, the tubes are fused to one another by inserting hot mandrels into adjacent tubes to soften and expand the tubes into fusing engagement with one another. An example of this construction may be seen in U.S. Pat. No. 2,433,546, entitled METHOD AND APPARATUS FOR FORMING PLASTIC RADIATOR CORES and issued Dec. 30, 1947, to Cornelius. However, in this method also, the temperature of the mandrels must be very carefully controlled to prevent excessive or inadequate softening of the ends of the heat exchange tubes during the fusing operation. If not carefully controlled, the tubes of the core are excessively or inadequately fused. Proper alignment of tube ends, one with the others, is also difficult in known manufacturing methods. Additionally, although it is desirable to use dissimilar materials (e.g., Teflon, nylon, polyethylene, polypropylene, and most crystalline polymers) in fabricating separate elements of the core unit to maximize anticorrosive properties while minimizing cost, suitable adhesives for such dissimilar materials are expensive or simply unavailable; and consequently such dissimilar materials cannot be used.

SUMMARY OF THE INVENTION

The aforementioned problems are solved by the present invention. Essentially, a heat exchanger is provided including a housing constructed from modular, generally identical duct units which interfit with one another to define the core chamber. Accordingly, the number of parts required to assemble the housing is greatly reduced over known heat exchangers, reducing both the initial cost of manufacture of the unit and subsequent inventorying of replacement parts.

Further, the heat exchanger includes a core comprising first and second end walls and a plurality of tubes extending between and communicating through the end walls. Each of the end walls includes a plurality of tubular projections, or pockets, extending from the end wall in a common direction. Opposite ends of the tubes are secured within the pockets in the end walls. Consequently, the core is extremely strong and durable, and yet may be constructed relatively easily and inexpensively.

Additionally, the present invention includes a preferred method for forming the core of the heat exchanger including the steps of providing an end plate defining a plurality of pockets extending in a common direction from the end plate, inserting a heat exchange tube into each one of the pockets in the end plate, and severing the pockets to expose the interior of the tubes through the end plates. Accordingly, the present core is more readily and inexpensively manufactured than core units currently available on the market. Additionally, the method greatly reduces the possibility of spoilage during manufacture of the core unit. Preferably, the end plate and the heat exchange tubes are both fabricated of fusible materials, and the pockets are severed using a hot element to also fuse the tubes in the end wall. In such case, virtually any thermoplastic, or even dissimilar thermoplastics, can be used in core fabrication.

These and other objects, advantages, and features of the invention will be more readily understood and appreciated by reference to the written specification and appended drawings.

DESCRIPTION OF THE PREFERRED EMBODIMENT

Figure 1:
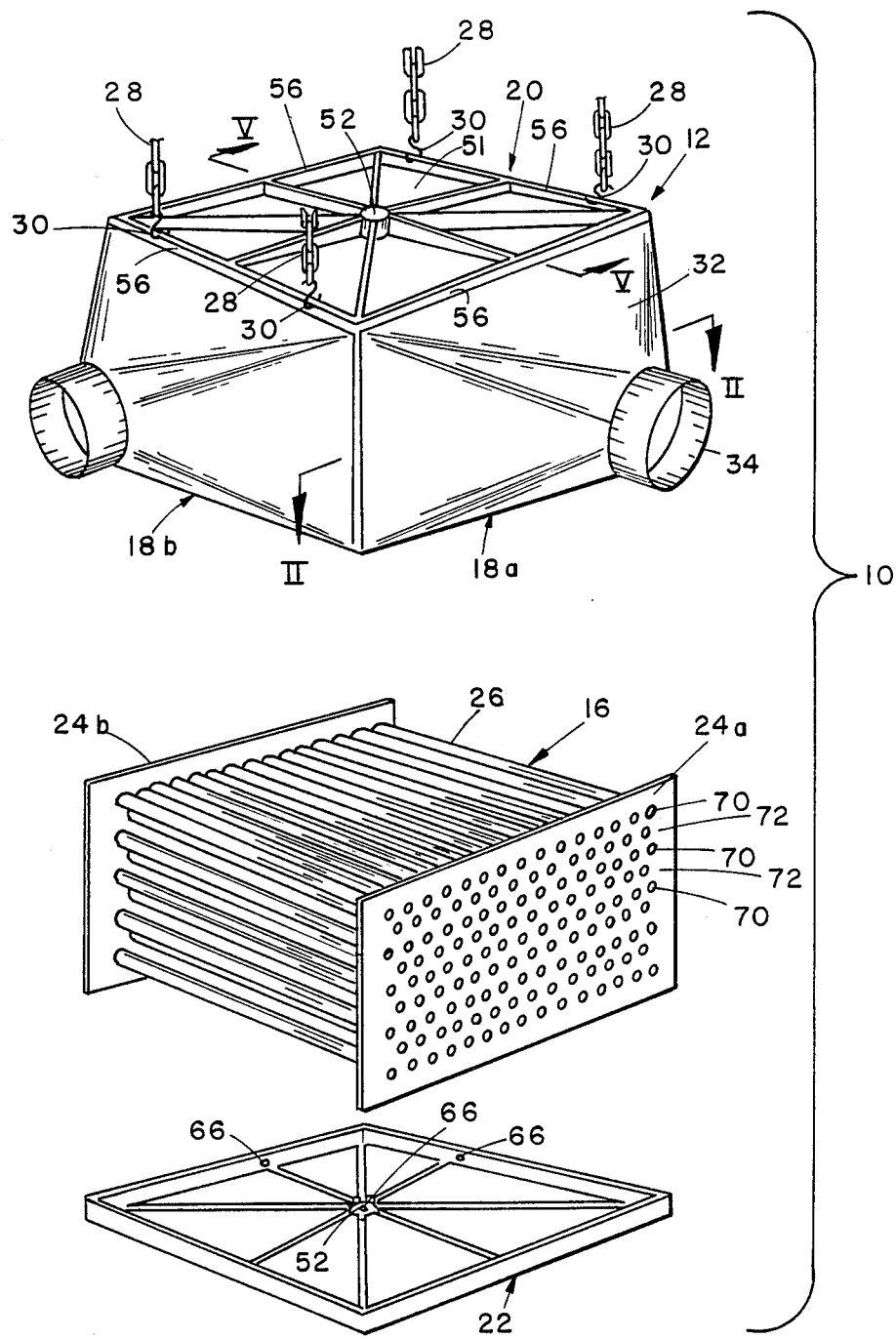
FIG. 1 is a perspective, exploded view of the heat exchanger of the present invention.

A heat exchanger constructed in accordance with a preferred embodiment of the invention is illustrated in the drawings and generally designated 10. The exchanger includes housing 12 (FIGS. 1, 2, and 5), defining a core-receiving chamber 14 (FIG. 2), and core 16 (FIGS. 1, 2, and 5) slidably mounted therein. Housing 12 comprises four identical duct units 18, top 20 permanently secured to the duct units, and a bottom 22 releasably secured to the duct units. Core 16 is slidably received within housing 12 through the lower end of the housing with bottom 22 removed therefrom. Core 16 comprises a pair of end plates 24 and a plurality of heat exchanger tubes 26 extending between, and communicating through, the end plates. End plates 24 are dimensioned to closely interfit within chamber 14 (FIGS. 2 and 5) such that a mass of air traveling through heat exchanger 10 through duct 18a to duct 18c must pass through tubes 26 and a mass of air passing through duct 18b to 18d must pass over and around tubes 26.

Heat exchanger 10 effects an air-to-air heat exchange, particularly where one of the air masses is dirty or contaminated. One such environment is a poultry confinement area, where the air to be exhausted from the confinement area contains suspended dust, feathers, and other particulate and/or corrosive matter. Housing 12 is suspended from the ceiling of the poultry confinement area on chains 28, each of which includes S-hook 30 releasably secured in the housing. Warm exhaust air is forced through core 16 and more particularly through tubes 26 by moving the air through duct 18a to duct 18c. The make-up air (i.e., the ambient air outside the poultry confinement area) is forced past core 16, and more particularly over and around tubes 26 by moving the air through duct 18b to duct 18d. Core 16 is releasably maintained within housing 12 on bottom 22. Periodically, as necessary, core 16 is removed from housing 12, by releasing bottom 22 from the remainder of the housing and lowering both the core and the bottom. Core 16 is then cleaned, for example by hosing off heat exchange tubes 26 so that any particulate matter collected therein is washed away. Core 16 is then replaced within housing 12 and bottom 22 secured to ducts 18 so that the unit is again operational.

Figure 2:
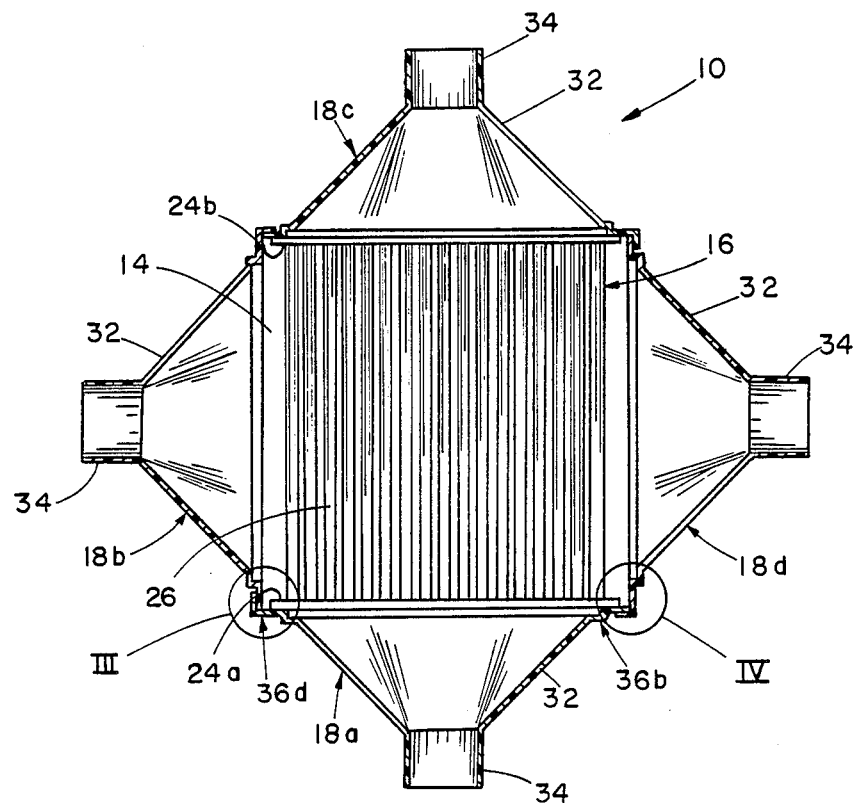
FIG. 2 is a sectional view of the assembled heat exchanger taken along plane II—II in FIG. 1.
Figure 3:
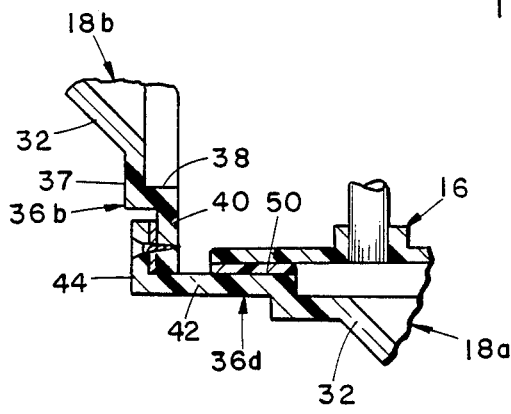
FIG. 3 is a fragmentary, enlarged view of the area within circle III in FIG. 2.

Turning more specifically to the construction of housing 12, duct units 18 (FIGS. 1, 2, and 5) each include a funneled portion 32 and a cylindrical connecting portion 34 leading therefrom. Ducts 18a, 18b, 18c, and 18d are generally identical to one another; consequently, only duct 18a will be described in detail. Connecting portion 34 is dimensioned to receive flexible duct (not shown) or other apparatus suitable to convey an air mass to or from heat exchanger 10. Funnel portion 32 flares outwardly from connecting portion 34 and terminates in upper flange 36a (FIGS. 5 and 6), right flange 36b (FIGS. 2 and 4), lower flange 36c (FIG. 5), and left flange 36d (FIGS. 2 and 3). All of flanges 36 together define a generally rectangular end to funnel portion 32.

Upper flange 36a (FIGS. 5 and 6) extends upwardly from funnel portion 32 and is oriented generally perpendicularly to the axis of connecting portion 34. Lower flange 36c is generally identical to and coplanar with upper flange 36a however extending from funnel 32 in a direction opposite to the upper flange. Flanges 36a and 36c provide an attachment surface for top 20 and bottom 22 as will be described.

Right side flange 36b (FIGS. 2 and 4) has a dogleg cross section comprising lateral portion 37 extending from funnel 32, offset portion 38 extending from the lateral portion, and securing portion 40 extending from the offset portion. Lateral portion 37 and securing portion 40 are generally perpendicular to the axis of connecting portion 34 and also generally perpendicular to offset portion 38. Left side flange 36d (FIGS. 2 and 3) is generally L-shaped in cross section including lateral portion 42 oriented generally perpendicularly to the axis of connecting portion 34, and securing portion 44 oriented generally perpendicularly to the lateral portion.

Figure 4:
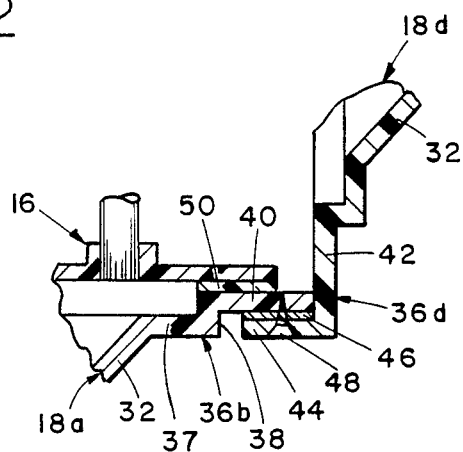
FIG. 4 is a fragmentary, enlarged view of the area within circle IV in FIG. 2.

As illustrated in FIGS. 3 and 4, adjacent duct units are secured together by overlying securing portion 44 of left side flange 36d of one duct over securing portion 40 of right side flange 36b of an adjacent duct. The two overlying portions 40 and 44 may be secured together using any combination of adhesive 46, screws 48, or rivets (not shown). To construct a complete housing 12, four ducts 18 are interconnected resulting in the configuration shown in FIG. 2. For purposes of description only, duct 18a will be denominated the exhaust air inlet duct; duct 18b the make-up air inlet duct; duct 18c the exhaust air outlet duct; and duct 18d the make-up air outlet duct. Compressive seals 50, such as neoprene, are secured to the inner surfaces of side flanges 36b and 36d (FIGS. 3 and 4) of duct units 18a and 18c to seal core 16 against housing 12 as will be described. All of ducts 18, as well as top 20 and bottom 22 are fabricated of a thermoplastic material, such as ABS, approximately oneeighth inch thick.

Top 20 and bottom 22 (FIGS. 1 and 5) are generally identical to one another; consequently, only top 20 will be described in detail. Top 20 includes a generally square body 51; hub 52, formed in the center of top 20, and eight ribs 54 extending from hub 52 to the perimeter of the cover. Peripheral channel 56 (FIGS. 1 and 6) is formed about the entire perimeter of top 20. Channel 56 is generally U-shaped in cross section (FIG. 6) comprising a first flange 58 extending upwardly and generally perpendicularly from body 51, a bight portion 60 extending generally perpendicularly outwardly from flange 58, and outer flange 62 extending generally perpendicularly downwardly from bight portion 60. The width of channel 56 is selected such that top flange 36a and end plate 24 fit side-by-side within the channel. Upper flange 36a is permanently secured to outer flange 62 using any combination of adhesive, screws 64, or rivets (not shown), for example as used to interconnect duct units 18.

Bottom 22 (FIGS. 1 and 5) additionally defines five drain holes 66 through which condensate within chamber 14 can exit. One of holes 66 is located in hub 52 and the others are located one each in the center of each side of the bottom. Latches 68 (FIG. 5) extending between each of ducts 18 and bottom 22 releasably secure the bottom to the ducts. The latches may be any type commercially available for releasably securing one object to another. Lower flanges 36c of ducts 18 and end plates 24 are received within perimeter channel 56 of bottom 22 (similar to FIG. 6) when the bottom is secured to the duct units.

Core 16 (FIGS. 1, 2, and 5) includes end plates 24a and 24b and a plurality of heat exchange tubes 26 extending therebetween. End plates 24 and tubes 26 are fabricated from a thermoplastic material, such as ABS, with the plates being approximately one-eighth inch thick. Each of tubes 26 is approximately one-half inch in diameter and includes a wall which is approximately three to five, and preferably four, mils thick. This wall thickness has been selected as providing the requisite strength for core 16 while permitting the desired heat transfer between the air within and without tubes 26. The tubes are secured to and communicate through both of end plates 24. Additionally, tubes 26 are arranged into alternate horizontal offset rows designated 70 and 72 (FIG. 1) along the height of core 16. The center-to-center distance along a horizontal line between any two adjacent tubes is approximately one and onequarter inches. The center-to-center distance along a vertical line between any pair of tubes both in alternate rows 70 or 72 is approximately three-quarters inch. Accordingly, the vertical distance between the center lines of adjacent rows 70 and 72 is approximately three-eighths inch.

Figure 7:
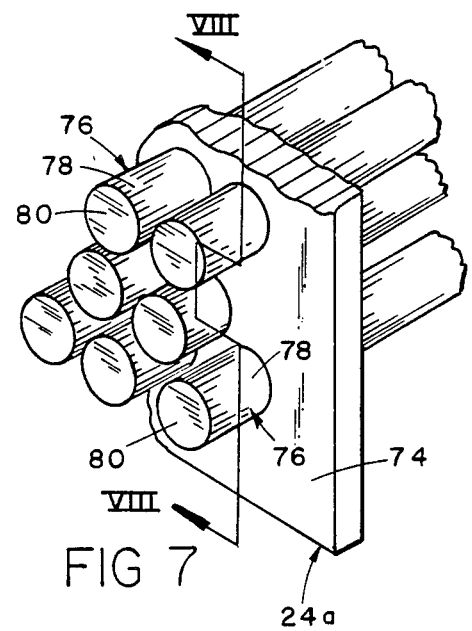
FIG. 7 is a fragmentary, perspective view of a core end plate with heat exchange tubes inserted therein prior to removal of the end plate pockets.
Figure 8:
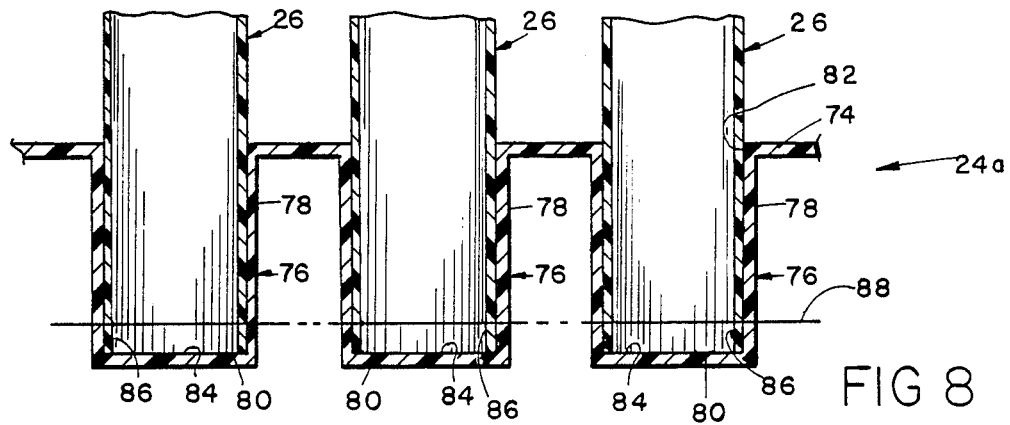
FIG. 8 is a sectional view taken along plane VIII—VIII in FIG. 7.

As illustrated in FIGS. 7 and 8, core 16 of the present invention is constructed in accordance with a novel method. Prior to assembly of core 16, each of end plates 24 has a honeycombed configuration, including a generally planar body portion 74 and a plurality of pockets 76 extending from a common side thereof. Each of pockets 76 includes a generally cylindrical side wall 78 integrally joined to body 74 and a bottom wall 80 (FIG. 8). Accordingly, each of pockets 76 defines an open end 82 generally coplanar with body 74 and a closed, or abutment, end 84 which serves as an abutment surface for tubes 26.

Core 16 is constructed by inserting end 86 of one of tubes 26 into each of pockets 76 in end wall 24a. Preferably, tubes 26 are fully inserted into pocket 76 so that tube end 86 abuts surface 84 of bottom wall 80. After one of tubes 26 has been so inserted into each of pockets 76, the pockets and tubes located therein are severed, or cut, for example along line 88 to expose the interiors of tubes 26 through end plate 24. If tubes 26 and end plates 24 are fabricated of fusible materials, for example those plastics that cannot be easily bonded together with an adhesive, the cut along line 88 may be made with a hot wire. As the wire passes through pockets 76, the pockets are severed, and each of tubes 26 is fused with its associated pocket to fuse, or fasten, the tubes within end plate 24. Consequently, dissimilar and hard-to-bond materials can be joined to form a high-strength core. Alternatively, a saw may be used to sever pockets 76; in such case it is preferable to include an adhesive between tube ends 86 and pockets 76 to insure the proper securement of the tubes within the pockets. Tubes 26 can be attached to end plate 24a by dipping the end plate into a suitable adhesive (e.g., solvent cement, thermosetting/chemically curing adhesives) and positioning the tubes in pockets 76. Opposite end wall 24b is secured to tubes 26 in an analogous manner.

Figure 5:
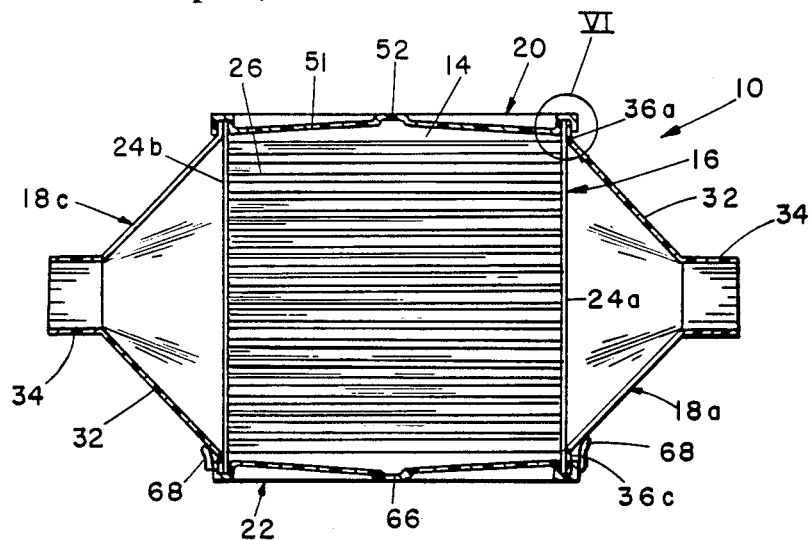
FIG. 5 is a sectional view of the assembled heat exchanger taken along plane V—V in FIG. 1.
Figure 6:
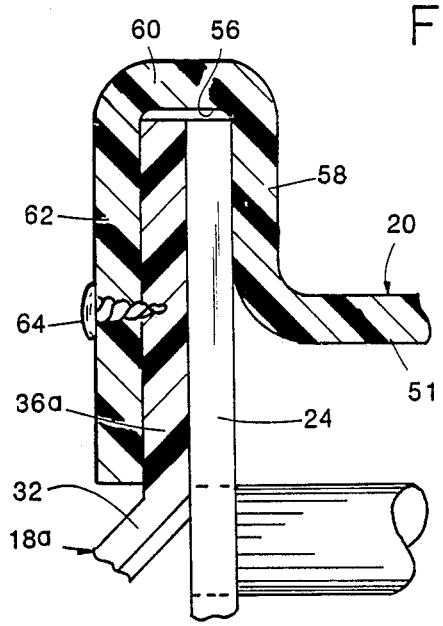
FIG. 6 is a fragmentary, enlarged view of the area within circle VI in FIG. 5.

End plates 24 are selected to extend the full width between side flanges 36b and 36d (FIG. 2) and the full height between top and bottom flanges 36a and 36c (FIG. 5). Consequently, end plate 24a (FIG. 2) is sealed about the entire periphery of exhaust air inlet ducts 18a. Similarly, end plate 24b is sealed about the entire periphery of exhaust air outlet duct 18c.

ASSEMBLY AND OPERATION

Housing 12 is fabricated by first permanently securing four duct units 18 together (FIG. 2) to define core-receiving chamber 14. Top 20 is then permanently secured to ducts 18. Latches 68 are installed on ducts 18 and bottom 22 so that the bottom may be releasably secured to the remainder of housing 12.

Core 16 is fabricated and inserted itno housing 12 through the opening exposed when bottom 22 is removed from the housing. Typically, core 16 is placed on bottom 22 which is then raised into position, raising the core into core-receiving chamber 14. Latches 68 are secured after bottom 22 is fully seated to secure core 16 within chamber 14. Heat exchanger 10 is suspended from the ceiling of the poultry house on chains 28 with S-hooks 30 inserted through receiving holes in housing 12. Appropriate air handling equipment, such as flexible ducts, fans, and filters, are then connected to each of connecting portions 34 of duct units 18.

Air handling equipment is connected so that the contaminated exhaust air is forced through exchanger 10 from duct 18a to duct 18c so that the air must pass through tubes 26. The make-up air to be heated or cooled is forced through exchanger 10 from duct 18b to 18d. As the two masses of air are conveyed through the duct, the heat from the warm air is transferred to the cool air through tubes 26. The turbulance created in the make-up air as the air must pass around and over the tubes enhances the heat transfer. The extent of the heat transfer is determined by the material of which tubes 26 is constructed, the thickness of the walls of the tubes, the dimensions of the tubes, and the configuration of the tubes for creating turbulance. As the exhaust air is conveyed through exchanger 10, the particulate matter suspended therein will be deposited inside tubes 26. Consequently, it will be necessary to periodically remove core 16 from housing 12 for cleaning. This is easily accomplished by unlatching latches 68 and lowering bottom 22 and core 16 resting thereon out of the remainder of housing 12. Core 16, particularly tubes 26, may then be hosed off or otherwise cleaned and then reinstalled within housing 12 for further heat exchanger operation. Optionally, core 16 may be secured, for example using adhesive, to bottom 22 to prevent accidental sliding of the core from the bottom during removal or installation of the core.

It should be understood that the above descriptions are intended to be three preferred embodiments of the invention. Various changes and alterations might be made without departing from the spirit and broader aspect of the invention as set forth in the appended claims, which are to be interpreted in accordance with the principles of patent law, including the doctrine of equivalents.

The embodiments of the invention in which an exclusive property or privilege is claimed are defined as follows:

1. An intermediate article useful in the manufacture of a heat exchanger core comprising:
    first and second one-piece thermoplastic end plates each of which includes a thin planar wall and a plurality of closed pockets extending from a common side of said wall, each of said pockets including a tubular sidewall of uniform cross section throughout its length and an abutment surface extending perpendicularly from said sidewall, each said abutment surface comprising a continuous planar floor connected to the entire periphery of said sidewall to close each of said pockets, the depth of all of said pockets from said wall to said abutment surface being uniform, said first and second plates being oriented such that the pockets of one plate open towards the other plate; and a plurality of thermoplastic tubular members each of uniform cross section throughout its length and each of which includes a first end extending through said first think planar wall and closely received within one of said first end wall pockets abutting the associated abutment surface and a second end extending through said second thin planar wall and closely received within one of said second end wall pockets abutting the associated abutment surface, whereby said tubes are uniformly registered with respect to both of said end plates, and further whereby severing each pocket and tube positioned therein will expose said tubes through said end plate.

2. A heat exchanger core as defined in claim 1 wherein each of said tubes is adhesively secured within the associated pocket.

* * * * *

UNITED STATES PATENT AND TRADEMARK OFFICE
CERTIFICATE OF CORRECTION

PATENT NO. : 4,735,261

DATED : April 5, 1988

INVENTOR(S) : Fritz Huebner

It is certified that error appears in the above-identified patent and that said Letters Patent is hereby corrected as shown below:

In The Title:
 "PLASTIC HEAT EXCHANGER" should be --HEAT EXCHANGER CORE--

Column 4, Line 34:
 "oneeighth" should be --one-eighth--

Column 5, Line 15:
 "onequarter" should be --one-quarter--

Column 5, Line 62:
 "ducts" should be --duct--

Column 7, Line 6:
 "think" should be --thin--

Signed and Sealed this

Eighteenth Day of October, 1988

Attest:

DONALD J. QUIGG

*Attesting Officer*        Commissioner of Patents and Trademarks